US012618716B2

(12) United States Patent
Song et al.

(10) Patent No.: US 12,618,716 B2
(45) Date of Patent: May 5, 2026

(54) THERMAL IMAGE SENSOR AND METHOD OF MANUFACTURING THE SAME

(71) Applicant: SAMSUNG ELECTRONICS CO., LTD., Suwon-si (KR)

(72) Inventors: Byong Gwon Song, Suwon-si (KR); Jin Myoung Kim, Suwon-si (KR); Jae Chul Park, Suwon-si (KR); Yong Seop Yoon, Suwon-si (KR); Du Hyun Lee, Suwon-si (KR); Jae Kwan Kim, Suwon-si (KR); Choong Ho Rhee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 18/630,655

(22) Filed: Apr. 9, 2024

(65) Prior Publication Data

US 2025/0216266 A1    Jul. 3, 2025

(30) Foreign Application Priority Data

Dec. 28, 2023    (KR) ........................ 10-2023-0193898

(51) Int. Cl.
 *G01J 5/02*       (2022.01)
 *G01J 5/20*       (2006.01)
 *G01J 5/22*       (2006.01)
 G01J 5/00       (2022.01)

(52) U.S. Cl.
 CPC ................. *G01J 5/22* (2013.01); *G01J 5/024* (2013.01); *G01J 2005/0077* (2013.01); *G01J 2005/204* (2013.01)

(58) Field of Classification Search
 CPC ...... G01J 5/22; G01J 5/024; G01J 2005/0077; G01J 2005/204; G01J 5/023; G01J 5/20
 See application file for complete search history.

(56) References Cited

U.S. PATENT DOCUMENTS

| | | | |
|---|---|---|---|
| 10,234,332 B2 | 3/2019 | Roehrer et al. | |
| 10,403,674 B2 | 9/2019 | Kropelnicki et al. | |
| 10,732,050 B2 | 8/2020 | Yon et al. | |
| 11,815,400 B2 | 11/2023 | Aliane et al. | |
| 2012/0132804 A1* | 5/2012 | Lee ........................ | G01J 5/046 |
| | | | 257/E31.093 |

FOREIGN PATENT DOCUMENTS

| | | |
|---|---|---|
| JP | 8-297052 A | 11/1996 |
| KR | 10-2021-0013722 A | 2/2021 |

* cited by examiner

*Primary Examiner* — Courtney D Thomas
(74) *Attorney, Agent, or Firm* — Sughrue Mion, PLLC

(57) ABSTRACT

A thermal image sensor and a method of manufacturing the same are provided. A row electrode and a column electrode are formed on a substrate. A multi-layer stack includes a sensing layer, a first sensing electrode and a second sensing electrode which are in contact with the sensing layer with a channel formed between the first sensing electrode and the second sensing electrode, an absorbing electrode connected to the first sensing electrode, an insulating layer configured to insulate the absorbing electrode from the second sensing electrode and the sensing layer, and a protecting layer configured to cover an exterior. Supports are configured to allow the multi-layer stack to float with respect to the substrate. A first intervening electrode and a second intervening electrode are configured to connect the low electrode and the column electrode to the first sensing electrode and the second sensing electrode through the supports.

20 Claims, 13 Drawing Sheets

THERMAL IMAGE SENSOR AND METHOD OF MANUFACTURING THE SAME

CROSS-REFERENCE TO RELATED APPLICATION(S)

This application claims priority from Korean Patent Application No. 10-2023-0193898, filed on Dec. 28, 2023, in the Korean Intellectual Property Office, the disclosure of which is incorporated herein by reference in its entirety.

BACKGROUND

1. Field

Apparatuses and methods consistent with embodiments of the disclosure relate to a thermal image sensor for converting incoming light energy in a predetermined wavelength range into heat energy and outputting the heat energy to generate image data.

2. Description of the Related Art

The sensing materials of uncooled Long-wave Infrared (LWIR) sensors have been developed into two types: Vanadium oxide (VOx) and amorphous silicon (a-Si). Recently, in consideration of compatibility with the CMOS manufacturing process, sensors using the PN diode have reached a commercialization stage, and besides, research has been conducted on various devices/materials and the like for use in uncooled LWIR sensors.

Responsivity, which represents the sensitivity of the LWIR sensor, is defined by how efficiently the LWIR sensor converts input power into a voltage value. The responsivity is determined based on parameters, such as input power, readout current, sensor resistance, and temperature change. If the sensor resistance value and readout current are the same, higher temperature Coefficient of Resistance (TCR), which indicates resistance change characteristics according to the inherent temperature of a material, is more effective in increasing the responsivity. Alternatively, in the case of applying a semiconductor material, such as α-Si, to a sensing material, responsivity may be increased by allowing for higher current flow at lower input voltages, assuming that the Temperature Coefficient of Resistance (TCR) is constant.

There have been proposed methods for improving thermal capacity and thermal conductivity of a sensing unit in order to increase responsivity, but in a bolometer structure using a semiconductor material such as α-Si, a method of increasing the width of a sensing electrode is proposed or structural changes for adjusting the spacing between sensing electrodes are proposed in order to improve current characteristics of the sensing unit. In a bolometer pixel, as the thermal conductivity and thermal capacity decreases, the change in temperature of the sensing unit increases under the same input power conditions.

As the pixel size decreases in order to increase the resolution of a sensor, a method for reducing thermal conductivity is required. A widely known method involves increasing the length of a support arm that supports a sensing unit, but the method has a problem in that the effective area of the sensor is limited. Accordingly, decreasing the thermal capacity of the sensor is important in improving the sensor performance. In the existing sensing materials such as Vox and α-Si described above, the sensor is in the form of a surface, such that the effect of decreasing the thermal capacity of the sensor is limited.

SUMMARY

According to an aspect of an example embodiment, a thermal image sensor may include: a multi-layer stack including: a sensing layer configure to convert light energy into heat energy; a first sensing electrode and a second sensing electrode which are in contact with the sensing layer; a channel formed between the first sensing electrode and the second sensing electrode, an absorbing electrode connected to the first sensing electrode, an insulating layer configured to insulate the absorbing electrode from the second sensing electrode and the sensing layer; and a substrate physically separated from the sensing layer and configured to detect a change in a temperature of the sensing layer.

The substrate is positioned further away from the first sensing electrode and the second sensing electrode than from the sensing layer; and the substrate is positioned further away from the absorbing electrode than from the first sensing electrode and the second sensing electrode.

The substrate is positioned further away from the first sensing electrode and the second sensing electrode than from the sensing layer; and the substrate is positioned closer to the absorbing electrode than to the sensing layer.

The substrate is positioned closer to the first sensing electrode and the second sensing electrode than to the sensing layer; and the substrate is positioned further away from the absorbing electrode than from the sensing layer.

The substrate is positioned closer to the first sensing electrode and the second sensing electrode than to the sensing layer; and the substrate is positioned closer to the absorbing electrode than to the first sensing electrode and the second sensing electrode.

A center region of the absorbing electrode corresponds to a center region of the channel provided between the first sensing electrode and the second sensing electrode.

The multi-layer stack may further include a resistance reducing layer provided between the first sensing electrode and the sensing layer and between the second sensing electrode and the sensing layer.

The resistance reducing layer contains a donor impurity and an acceptor impurity.

The absorbing electrode may include titanium nitride (Tin).

According to another aspect of the present disclosure, a bolometer may include: a substrate; a supporting arm provided on the substrate; and a multi-layer stack that is suspended above the substrate through the supporting arm, and includes: a sensing layer configure to convert light energy into heat energy; a first sensing electrode and a second sensing electrode which are in contact with the sensing layer; a channel formed between the first sensing electrode and the second sensing electrode, an absorbing electrode connected to the first sensing electrode and configured to generate polarization in the sensing layer, wherein the substrate may include at least one electrode connected to the first sensing electrode and the second sensing electrode to detect a change in a temperature of the sensing layer.

According to an aspect of an example embodiment, a method of manufacturing a thermal image sensor may include: (a) forming a row electrode and a column electrode on a substrate, followed by sequentially stacking a sacrificial layer and a protecting layer; (b) forming anchor holes to expose the row electrode and the column electrode by etching through the protecting layer to the sacrificial layer, and then patterning a first intervening electrode and a second intervening electrode in the anchor holes and the protecting layer; (c) forming a multi-layer stack on the protecting layer, the multi-layer stack comprising a sensing layer, a first sensing electrode and a second sensing electrode which are in contact with the sensing layer with a channel formed between the first sensing electrode and the second sensing electrode, and are connected to the first intervening electrode and the second intervening electrode, an absorbing electrode connected to the first sensing electrode, and an insulating layer configured to insulate the absorbing electrode from the second sensing electrode and the sensing layer; and (d) removing the sacrificial layer.

The step (c) may include: forming the sensing layer on the protecting layer; forming the first sensing electrode and the second sensing electrode on the sensing layer to connect the first sensing electrode and the second sensing electrode to the first intervening electrode and the second intervening electrode; forming the insulating layer to cover the first sensing electrode, the second sensing electrode, and the sensing layer; and forming a via hole to expose the first sensing electrode in the insulating layer, and then forming the absorbing electrode in the via hole and the insulating layer.

The step (c) may include: forming the absorbing electrode on the protecting layer; forming the insulating layer to cover the absorbing electrode; forming the sensing layer on the insulating layer; and forming a via hole to expose the absorbing electrode in the insulating layer, and then forming the first sensing electrode in the via hole and the sensing layer to connect the first sensing electrode to the first intervening electrode, and forming the second sensing electrode on the sensing layer to connect the second sensing electrode to the second intervening electrode.

The step (c) may include: forming the first sensing electrode and the second sensing electrode on the protecting layer to connect the first sensing electrode and the second sensing electrode to the first intervening electrode and the second intervening electrode; forming the sensing layer on the first sensing electrode and the second sensing electrode; forming the insulating layer to cover the first sensing electrode, the second sensing electrode, and the sensing layer; and forming a via hole to expose the first sensing electrode in the insulating layer, and then forming the absorbing electrode in the via hole and the insulating layer.

The step (c) may include: forming the absorbing electrode on the protecting layer; forming the insulating layer to cover the absorbing electrode; forming a via hole to expose the absorbing electrode in the insulating layer, and then forming the first sensing electrode in the via hole and the insulating layer to connect the first sensing electrode to the first intervening electrode, and forming the second sensing electrode on the insulating layer to connect the second sensing electrode to the second intervening electrode; and forming the sensing layer on the first sensing electrode and the second sensing electrode.

The step (c) may include forming a resistance reducing layer between the first sensing electrode and the sensing layer and between the second sensing electrode and the sensing layer.

The resistance reducing layer contains a donor impurity and an acceptor impurity.

The absorbing electrode may include titanium nitride (Tin).

The first sensing electrode and the second sensing electrode may include titanium nitride (Tin).

The sensing layer may include Amorphous Silicon.

DETAILED DESCRIPTION

Figure 1:
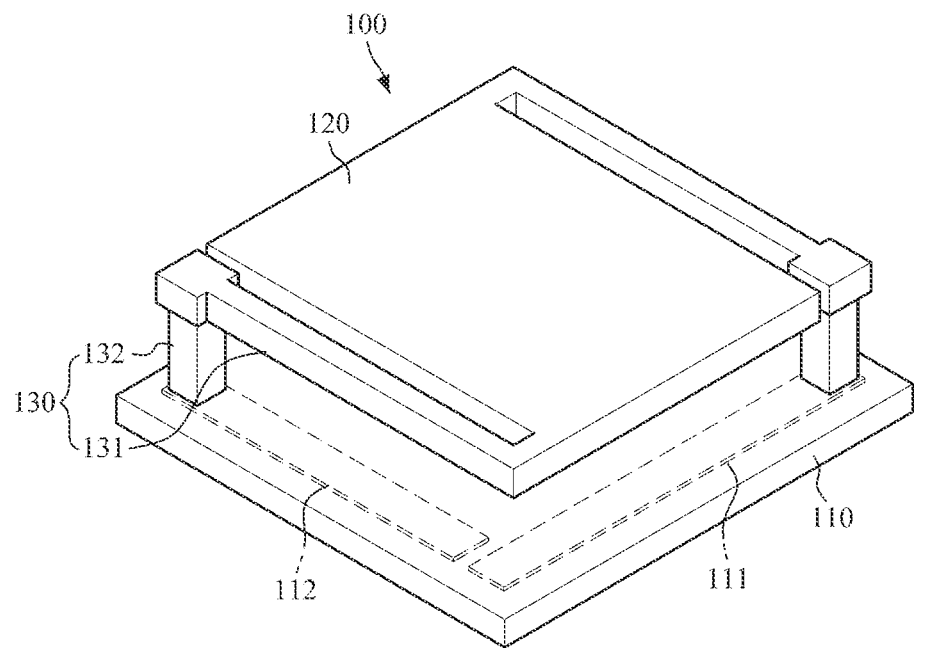
FIG. 1 is a perspective view of a thermal image sensor according to embodiments of the present disclosure.

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

It will be understood that, although the terms, "first," "second," etc., may be used herein to describe various elements, these elements should not be limited by these terms. These terms are only used to distinguish one element from another. Any references to singular may include plural unless expressly stated otherwise.

In addition, unless explicitly described to the contrary, an expression such as "comprising" or "including" will be understood to imply the inclusion of stated elements but not the exclusion of any other elements. Also, the terms, such as "unit" or "module," etc., should be understood as a unit that performs at least one function or operation and that may be embodied as hardware, software, or a combination thereof.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Figure 2:
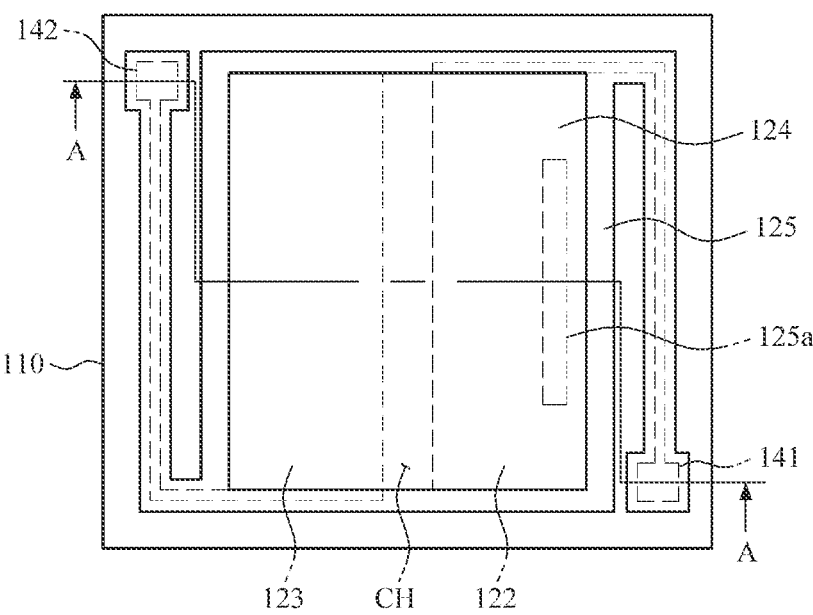
FIG. 2 is a plan view of the thermal image sensor shown in FIG. 1.
Figure 3:
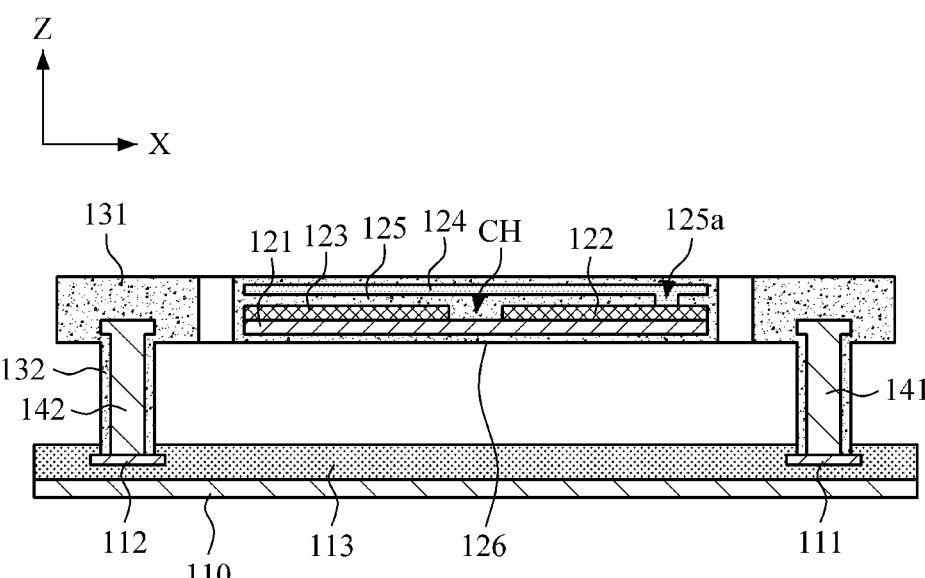
FIG. 3 is a cross-sectional view of the thermal image sensor of FIG. 1 taken along line A-A of FIG. 2.
Figure 4:
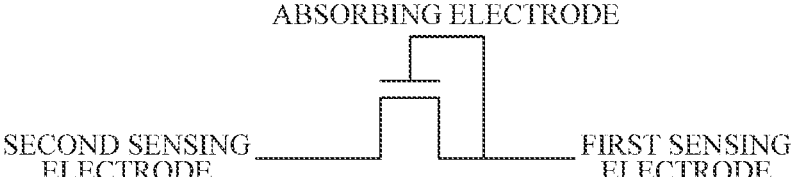
FIG. 4 is a circuit diagram of first and second sensing electrodes and an absorbing electrode.

FIG. 1 is a perspective view of a thermal image sensor according to embodiments of the present disclosure. FIG. 2 is a plan view of the thermal image sensor shown in FIG. 1. FIG. 3 is a cross-sectional view of the thermal image sensor of FIG. 1 taken along line A-A of FIG. 2. FIG. 4 is a circuit diagram of first and second sensing electrodes and an absorbing electrode of the thermal image sensor.

Referring to FIGS. 1 to 4, a thermal image sensor 100 according to the first embodiment of the present disclosure includes a substrate 110, a multi-layer stack 120, supports 130, a first intervening electrode 141, and a second intervening electrode 142.

Here, the thermal image sensor 100 may be composed of pixels in a microbolometer. The bolometer detects a temperature change based on a difference in electrical resistance of the bolometer which changes due to incoming thermal radiation.

A row electrode 111 and a column electrode 112 may be formed on the substrate 110. The row electrode 111 and the column electrode 112 may be in the form of strips and arranged perpendicular to each other. The row electrode 111 and the column electrode 112 may include conductive materials.

The row electrode 111 and the column electrode 112 may be covered by an electrode protective layer 113. The electrode protective layer 113 may include an insulating material, such as silicon dioxide ($SiO_2$) to protect and insulate the row electrode 111 and the column electrode 112. The substrate 110 may include silicon.

The row electrode 111 and the column electrode 112 may be electrically connected to a sensing layer 121 of the multi-layer stack 120 through the supports 130. The row electrode 111 and the column electrode 112 may apply a bias voltage so that a change in current due to a change in resistance of the sensing layer 121 may be detected by a Read-Out Integrated Circuit (ROIC).

An infrared radiation reflective layer may be provided on the substrate to increase heat absorption rate by reflecting light onto the multi-layer stack 120. The substrate 110 may also include the Read-Out Integrated Circuit (ROIC) to detect the change in the temperature of the sensing layer.

The multi-layer stack 120 may include a sensing layer 121, a first sensing electrode 122, a second sensing electrode 123, an absorbing electrode 124, an insulating layer 125, and a protecting layer 126.

The sensing layer 121 may absorb incoming light in a predetermined wavelength range. The sensing layer 121 may absorb the infrared wavelength. The sensing layer 121 may absorb light energy and convert it into heat energy to raise temperature of the sensing layer 121. The sensing layer 121 may include Amorphous Silicon (a-Si).

The first sensing electrode 122 and the second sensing electrode 123 may be in contact with the sensing layer 121 with a channel CH formed between the first sensing electrode 122 and the second sensing electrode 123. The first sensing electrode 122 and the second sensing electrode 123 may allow detection of a change in current flowing through the channel CH which is caused by a change in resistance of the sensing layer 121 due to incoming thermal radiation. The first sensing electrode 122 and the second sensing electrode 123 may include titanium nitride (Tin) having low reflectivity and high absorption rate.

The absorbing electrode 124 may be connected to the first sensing electrode 122. The absorbing electrode 124 may be included in the multi-layer stack 120, thereby enhancing the light receiving effect. The absorbing electrode 124 may include a material having low reflectivity (e.g., below 20%) and high absorption rate (e.g., above 80%, such as titanium nitride (Tin).

The absorbing electrode 124 may have a specific area and may be aligned with the channel CH formed between the first sensing electrode 122 and the second sensing electrode 123. For example, a central region of the absorbing electrode 124 may be aligned with or correspond to a central region of the channel CH in a longitudinal direction (X-direction in FIG. 3). An edge region of the absorbing electrode 124 extending from the central region of the absorbing electrode 124 may be aligned with edge regions of the first sensing electrode 122 and the second sensing electrode 123 in the longitudinal direction. The absorbing electrode 124 may have the height length as the height of the channel CH in a vertical direction (Z-direction in FIG. 3).

When a voltage is applied to the first sensing electrode 122, the absorbing electrode 124 generates polarization in a region of the sensing layer 121 that corresponds to the channel CH between the first sensing electrode 122 and the second sensing electrode 123. The polarization may induce a pinch-on state in the channel CH to create a conducting path between the first sensing electrode 122 and second sensing electrode 123, allowing current to flow at a lower driving voltage for sensing.

The insulating layer 125 may insulate the absorbing electrode 124 from the second sensing electrode 123 and the sensing layer 121. The insulating layer 125 may entirely cover the first and second sensing electrodes 122 and 123 and the sensing layer 121 to insulate the absorbing electrode 124 therefrom, and may connect the absorbing electrode 124 to the first sensing electrode 122 through a via hole 125a. The absorbing electrode 124 is formed in the via hole 125a of the insulating layer 125 to be connected to the first sensing electrode 122. The insulating layer 125 may include silicon nitride (SiNx) and the like.

The sensing layer 121 is positioned closer to the substrate 110, while the first sensing electrode 122 and the second sensing electrode 123 may be disposed at a distance further away from the substrate 110 than the sensing layer 121. The absorbing electrode 124 may be positioned at a distance even further away from the substrate 110 than the first sensing electrode 122 and the second sensing electrode 123.

The protecting layer 126 may cover the exterior of the multi-layer stack 120. If the sensing layer 121 and the absorbing electrode 124 are disposed on the outside, the protecting layer 126 may protect the sensing layer 121 and the absorbing electrode 124 by entirely covering the sensing layer 121 and the absorbing electrode 124. The protecting layer 126 may include silicon nitride and the like.

The supports 130 may allow the multi-layer stack 120 to float with respect to the substrate 110. Each support 130 may include a supporting arm 131 and a leg 132.

The supporting arms 131 may extend from diagonal corners of the multi-layer stack 120 and may be spaced apart from both sides of the multi-layer stack 120. The supporting arms 130, except the portions connected to the multi-layer stack 120, may have a uniform width and may be spaced apart by a predetermined distance from both sides of the multi-layer stack 120. The supporting arms 131 may include the same material as the insulating layer 125 and the protecting layer 126 of the multi-layer stack 120.

The legs 132 may protrude from the row electrode 111 and the column electrode 112, and may be connected to the extended ends of the supporting arms 130, thereby allowing the multi-layer stack 120 to float above the substrate 110. The legs 132 may allow the multi-layer stack 120 to float a distance, corresponding to one-quarter of an incident wavelength (λ), from the substrate 110. The legs 132 may include the same material as the supporting arms 131.

The first intervening electrode 141 and the second intervening electrode 142 may connect the row electrode 111 and the column electrode 112 to the first sensing electrode 122 and the second sensing electrode 123 through the supports 130. The first intervening electrode 141 may extend from the row electrode 111 to the first sensing electrode 122 of the multi-layer stack 120 through the inside of any one of the supports 130, to connect the row electrode 111 to the first sensing electrode 122.

The second intervening electrode 142 may extend from the column electrode 112 to the second sensing electrode 123 of the multi-layer stack 120 through the inside of another one of the supports 130, to connect the column electrode 112 to the second sensing electrode 123. The first and second intervening electrodes 141 and 142 may include conductive materials.

An example of operation of the thermal image sensor 100 according to the embodiment will be described below.

When a voltage is applied to a gate electrode in an Amorphous Silicon Thin Film Transistor (TFT), polarization occurs in the active layer on a dielectric material. Then, a path is formed through which a current may flow between a source electrode and a drain electrode, thereby inducing a pinch-on state. In this case, the voltage applied to the gate electrode corresponds to a threshold voltage. In this state, if a voltage is applied to the drain electrode, a current may flow from the source electrode to the drain electrode.

In this embodiment, based on the operating principle of the TFT, the absorbing electrode 124 may perform a similar function to the gate electrode. When a voltage is applied to the first sensing electrode 122, the voltage may also be applied to the absorbing electrode 124 connected to the first sensing electrode 122. This results in polarization within the insulating layer 125 which is in contact with the absorbing electrode 124, such that polarization may also occur in the sensing layer 121 corresponding to the channel CH between the first sensing electrode 122 and the second sensing electrode 123.

Due to the voltage applied to the absorbing electrode 124, a path is formed through which a current may flow to the channel CH between the first sensing electrode 122 and the second sensing electrode 123, thereby inducing a pinch-on state. In this case, the voltage applied to the absorbing electrode 124 may correspond to the threshold voltage. If a driving voltage greater than or equal to the threshold voltage is applied to the first sensing electrode 122, the current may flow to the channel CH between the first sensing electrode 122 and the second sensing electrode 123.

As described above, in comparison with an example in which a voltage is not applied to the absorbing electrode 124, a driving voltage may be further reduced in this embodiment, and the driving voltage may be reduced more if a lower threshold voltage is designed. Accordingly, the thermal image sensor 100 may operate at low power, and in response to even a slight thermal change, the thermal image sensor 100 may amplify the output current and increase a signal-to-noise ratio (SNR) to improve responsivity.

Figure 5:
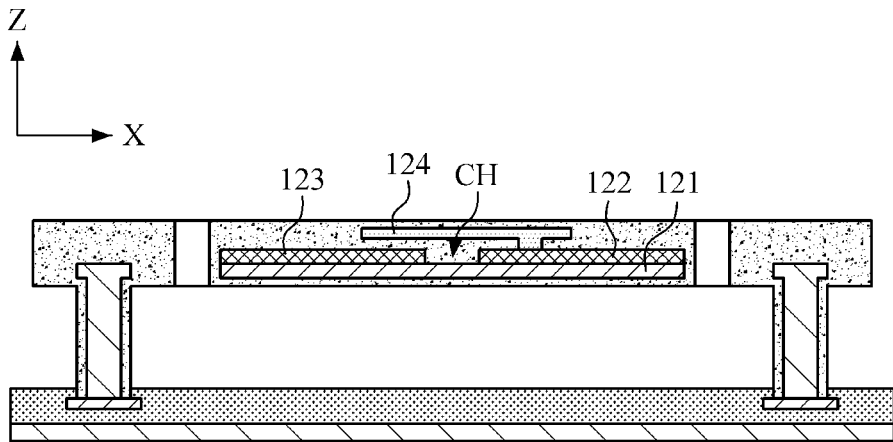
FIG. 5 is a cross-sectional view illustrating a modified example of an absorbing electrode of the thermal image sensor shown in FIG. 1.

FIG. 5 is a cross-sectional view illustrating a modified example of the absorbing electrode of the thermal image sensor shown in FIG. 1.

As illustrated in FIG. 5, the absorbing electrode 124 has the same height as the height of the channel CH in a direction (i.e., Z-direction in FIG. 5) perpendicular to a direction (i.e., X-direction in FIG. 5) of separation between the first sensing electrode 122 and the second electrode 123, and an overlapping area of the first sensing electrode 122 and the second sensing electrode 123 is reduced compared to the above example. Accordingly, capacitance generated between the first sensing electrode 122 and the second sensing electrode 123 may be reduced.

Figure 6:
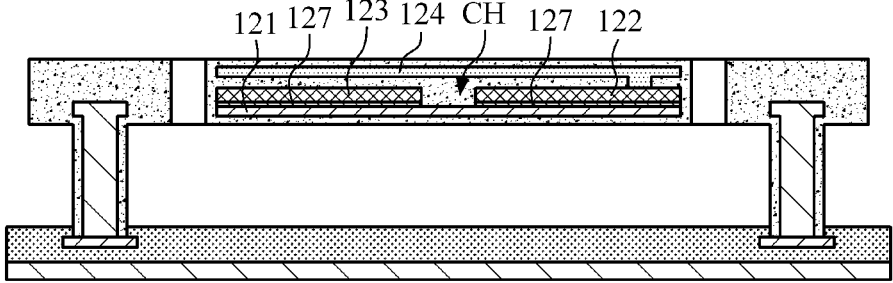
FIG. 6 is a cross-sectional view illustrating a resistance reducing layer added to the thermal image sensor shown in FIG. 1.

FIG. 6 is a cross-sectional view illustrating a resistance reducing layer added to the thermal image sensor shown in FIG. 1.

As illustrated in FIG. 6, the multi-layer stack 120 may include a resistance reducing layer 127 formed between the first sensing electrode 122 and the sensing layer 121 and between the second sensing electrode 123 and the sensing layer 121. The resistance reducing layer 127 may reduce contact resistance between the first sensing electrode 122 and the sensing layer 121, as well as contact resistance between the second sensing electrode 123 and the sensing layer 121.

The resistance reducing layer 127 may contain a donor impurity or an acceptor impurity. The resistance reducing layer 127 may be doped or deposited with n++ on the sensing layer 121 by using phosphorus or may be doped or deposited with p++ on the sensing layer 121 by using boron. In this embodiment, in a patterning process of the first and second sensing electrodes 122 and 123, a region of the resistance reducing layer 127 that corresponds to the channel CH may be removed, thereby reducing the process steps.

Figure 7:
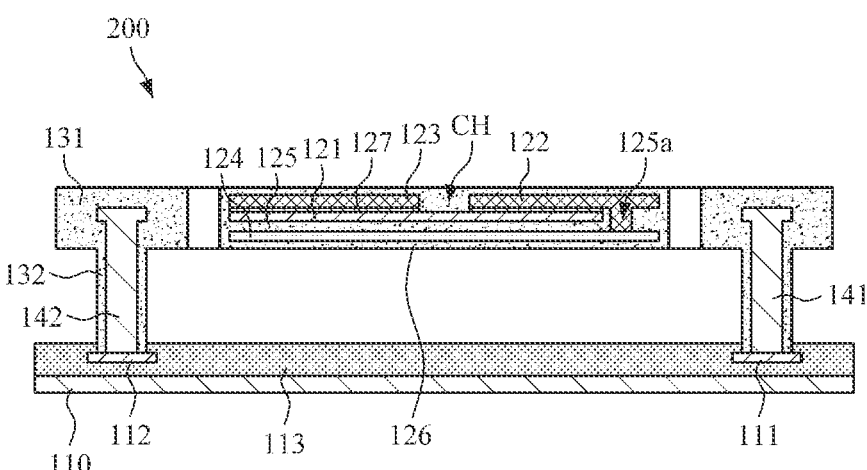
FIG. 7 is a perspective view of a thermal image sensor according to embodiments of the present disclosure.

FIG. 7 is a perspective view of a thermal image sensor according to embodiments of the present disclosure.

Referring to FIG. 7, in a thermal image sensor 200 according to embodiments of the present disclosure, the first sensing electrode 122 and the second sensing electrode 123 may be disposed at a greater distance from the substrate 110 than the sensing layer 121, and the absorbing electrode 124 may be disposed closer to the substrate 110 than the sensing layer 121. The first sensing electrode 122 may be formed in the via hole 125a of the insulating layer 125 to be connected to the absorbing electrode 124. In an additional embodiment, the resistance reducing layer 127 may be formed between the first sensing electrode 122 and the sensing layer 121 and between the second sensing electrode 123 and the sensing layer 121.

The thermal image sensor 200 may operate at low power, and in response to even a slight thermal change, the thermal image sensor 200 may amplify the output current. This enhancement in current amplification leads to an increased signal-to-noise ratio (SNR) and thereby improves the responsivity of the thermal image sensor 200.

In addition, an optical resonance structure of the thermal image sensor 200 may be easily formed between the absorbing electrode 124 and a reflective layer of the substrate 110. In a patterning process of the first and second sensing electrodes 122 and 123, a region of the resistance reducing layer 127 that corresponds to the channel CH may be removed, thereby reducing the process steps.

Figure 8:
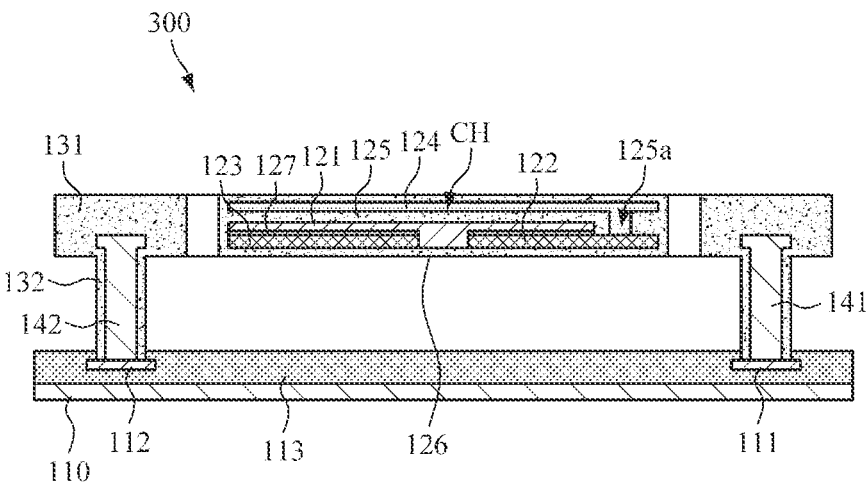
FIG. 8 is a perspective view of a thermal image sensor according to embodiments of the present disclosure.

FIG. 8 is a perspective view of a thermal image sensor according to embodiments of the present disclosure.

Referring to FIG. 8, in a thermal image sensor 300 according to embodiments of the present disclosure, the first sensing electrode 122 and the second sensing electrode 123 may be disposed closer to the substrate 110 than the sensing layer 121, and the absorbing electrode 124 may be disposed at a greater distance from the substrate 110 than the sensing layer 121. The absorbing electrode 124 may be formed in the via hole 125a of the insulating layer 125 to be connected to the first sensing electrode 122. In an additional embodiment, the resistance reducing layer 127 may be formed between the first sensing electrode 122 and the sensing layer 121 and between the second sensing electrode 123 and the sensing layer 121.

The thermal image sensor 300 may operate at low power, and in response to even a slight thermal change, the thermal image sensor 300 may amplify the output current and increase a signal-to-noise ratio (SNR) to improve responsivity. In addition, in this embodiment, the process may be simplified and streamlined by initially forming the first and second sensing electrodes 122 and 123, and then sequentially depositing the insulating layer 125 and the absorbing electrode 124, followed by patterning the sensing layer 121 simultaneously with the patterning of the absorbing electrode 124.

Figure 9:
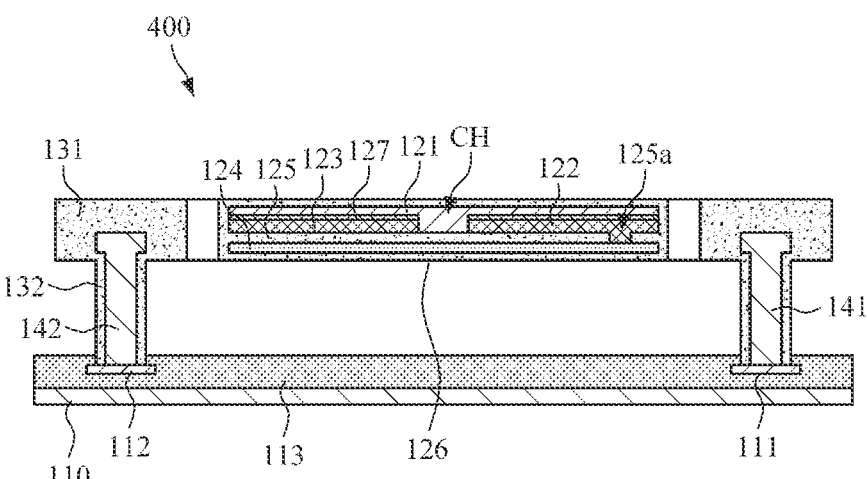
FIG. 9 is a perspective view of a thermal image sensor according to embodiments of the present disclosure.

FIG. 9 is a perspective view of a thermal image sensor according to embodiments of the present disclosure.

Referring to FIG. 9, in a thermal image sensor 400 according to embodiments of the present disclosure, the first sensing electrode 122 and the second sensing electrode 123 may be disposed closer to the substrate 110 than the sensing layer 121, and the absorbing electrode 124 may be disposed closer to the substrate 110 than the first sensing electrode 122 and the second sensing electrode 123. The first sensing electrode 122 may be formed in the via hole 125a of the insulating layer 125 to be connected to the absorbing electrode 124. In an additional embodiment, the resistance reducing layer 127 may be formed between the first sensing electrode 122 and the sensing layer 121 and between the second sensing electrode 123 and the sensing layer 121.

The thermal image sensor 400 may operate at low power, and in response to even a slight thermal change, the thermal image sensor 300 may amplify the output current and increase a signal-to-noise ratio (SNR) to improve responsivity. In addition, an optical resonance structure of the thermal image sensor 400 may be easily formed between the absorbing electrode 124 and a reflective layer of the substrate 110, such that it is effective in increasing the absorption rate.

Figure 10:
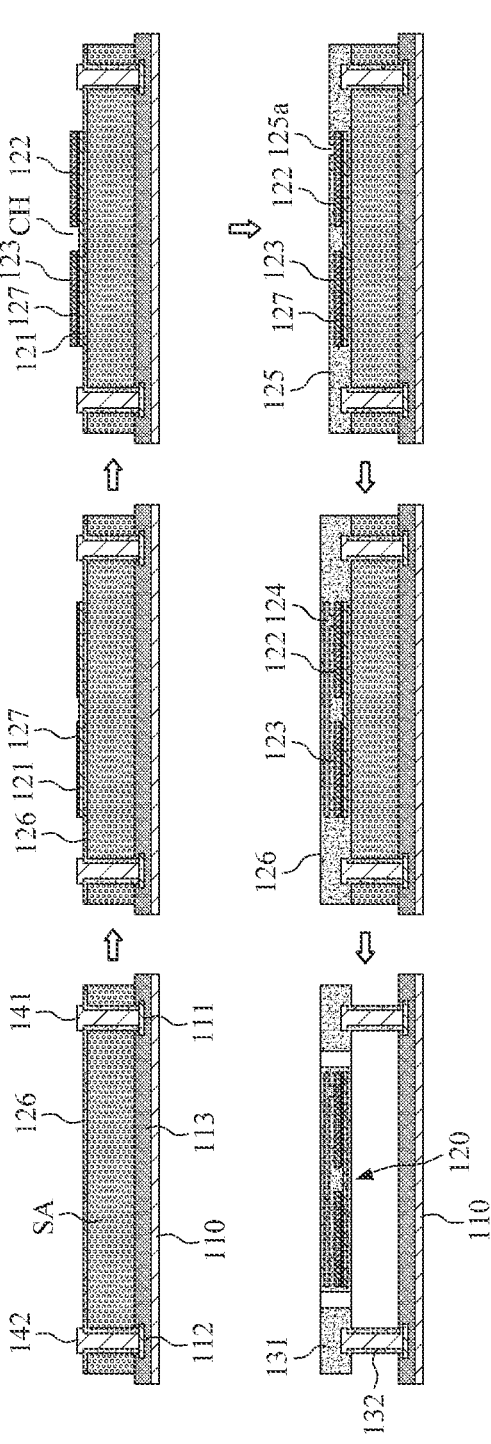
FIG. 10 is a diagram explaining a method of manufacturing the thermal image sensor according to the embodiments of the present disclosure.

FIG. 10 is a diagram explaining a method of manufacturing the thermal image sensor according to embodiments of the present disclosure.

Referring to FIG. 10, the row electrode 111 and the column electrode 112 may be first formed on the substrate 110, and then the sacrificial layer SA and the protecting layer 126 may be sequentially stacked thereon. In this case, an electrode protective layer 113 is formed on the substrate 110 along with the row electrode 111 and the column electrode 112, to protect and insulate the row electrode 111 and the column electrode 112. An infrared radiation reflective layer may be formed on the substrate 110.

The substrate 110 may include a material such as silicon and the like. The row electrode 111 and the column electrode 112 may include conductive materials. The electrode protective layer 113 may include an insulating material, such as silicon dioxide ($SiO_2$) and the like.

The sacrificial layer SA, formed as an amorphous carbon layer (ACL) and the like, may be stacked on the electrode protective layer 113. The sacrificial layer SA may be removed by a subsequent etching process, such that a separation space may be formed between the substrate 110 and the supports 130, and a cavity may be formed between the substrate 110 and the multi-layer stack 120. The protecting layer 126 may include silicon nitride and formed on the sacrificial layer SA.

Then, anchor holes for exposing the row electrode 111 and the column electrode 112 may be formed by passing from the protecting layer 126 to the sacrificial layer SA, and then the first intervening electrode 141 and the second intervening electrode 142 may be patterned in the anchor holes and the protecting layer 126.

Subsequently, the multi-layer stack 120 may be formed on the protecting layer 126, the multi-layer stack 120 including the sensing layer 121, the first sensing electrode 122 and the second sensing electrode 123 which are in contact with the sensing layer 121 with the channel CH formed between the first sensing electrode 122 and the second sensing electrode 123, and are connected to the first intervening electrode 141 and the second intervening electrode 142, the absorbing electrode 124 connected to the first sensing electrode 122, and the insulating layer 125 for insulating the absorbing electrode 124 from the second sensing electrode 123 and the sensing layer 121.

In this process, a process of forming the resistance reducing layer 127 with a donor impurity or an acceptor impurity between the first sensing electrode 122 and the sensing layer 121 and between the second sensing electrode 123 and the sensing layer 121 may be added.

For example, the multi-layer stack 120 may be manufactured as follows. First, the sensing layer 121 may be formed on the protecting layer 126. The sensing layer 121 may include amorphous silicon.

Then, the first sensing electrode 122 and the second sensing electrode 123 are formed on the sensing layer 121 and connected to the first intervening electrode 141 and the second intervening electrode 142. The first sensing electrode 122 and the second sensing electrode 123 may include titanium nitride (Tin) and the like. If the resistance reducing layer 127 is further formed on the sensing layer 121, the first and second sensing electrodes 122 and 123 may be formed on the resistance reducing layer 127.

Next, the insulating layer 125 may be formed for entirely covering the first sensing electrode 122, the second sensing electrode 123, and the sensing layer 121. The insulating layer 125 may include silicon nitride and the like.

Then, the via hole 125a for exposing the first sensing electrode 122 is formed on the insulating layer 125, and then the absorbing electrode 124 is formed in the via hole 125a and the insulating layer 125. The absorbing electrode 124 may include titanium nitride (Tin) and the like. Additionally, the protecting layer 126 may be formed for entirely covering the absorbing electrode 124. Then, the insulating layer 125 and the protecting layer 126 are partially removed by an etching process, to form the supporting arms 131 of the supports 130.

Subsequently, the sacrificial layer SA may be removed. The sacrificial layer SA may be removed by an etching process. After the sacrificial layer SA is removed, a cavity is formed between the multi-layer stack 120 and the substrate 110, and the supports 130 allow the multi-layer stack 120 to float above the substrate 110. Accordingly, the thermal image sensor 100 according to the first embodiment may be completed.

Figure 11:
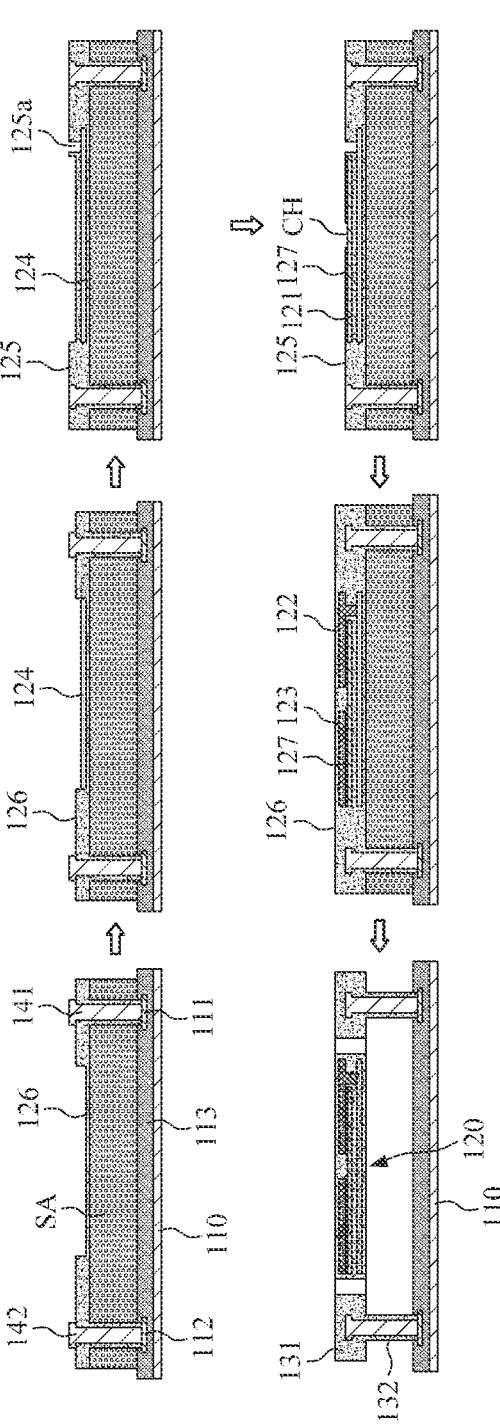
FIG. 11 is a diagram explaining a method of manufacturing the thermal image sensor according to the embodiments of the present disclosure.

FIG. 11 is a diagram explaining a method of manufacturing the thermal image sensor according to embodiments of the present disclosure.

Referring to FIG. 11, the row electrode 111 and the column electrode 112 may be first formed on the substrate 110, and then the sacrificial layer SA and the protecting layer 126 may be sequentially stacked thereon. Then, anchor holes for exposing the row electrode 111 and the column electrode 112 may be formed by passing from the protecting layer 126 to the sacrificial layer SA, and then the first intervening electrode 141 and the second intervening electrode 142 may be patterned in the anchor holes and the protecting layer 126. This process may be performed in the same manner as in the above embodiment.

Then, the absorbing electrode 124 may be formed on the protecting layer 126. Subsequently, the insulating layer 125 may be formed for entirely covering the absorbing electrode 124. In this case, the insulating layer 125 may be patterned for providing an area in which the sensing layer 121 is to be formed. Then, the sensing layer 121 may be formed on the insulating layer 125.

Next, the via hole 125a for exposing the absorbing electrode 124 is formed on the insulating layer 125, and then the first sensing electrode 122 is formed in the via hole 125a and the sensing layer 121, to be connected to the first intervening electrode 141. Then, the second sensing electrode 123 is formed on the sensing layer 121 to be connected to the second intervening electrode 142. If the resistance reducing layer 127 is further formed on the sensing layer 121, the first and second sensing electrodes 122 and 123 may be formed on the resistance reducing layer 127.

Then, the protecting layer 126 may be formed for entirely covering the first and second sensing electrodes 122 and 123. Then, the insulating layer 125 and the protecting layer 126 are partially removed by an etching process, to form the supporting arms 131 of the supports 130. Next, the sacrificial layer SA may be removed to complete the manufacturing process of the thermal image sensor 200.

Figure 12:
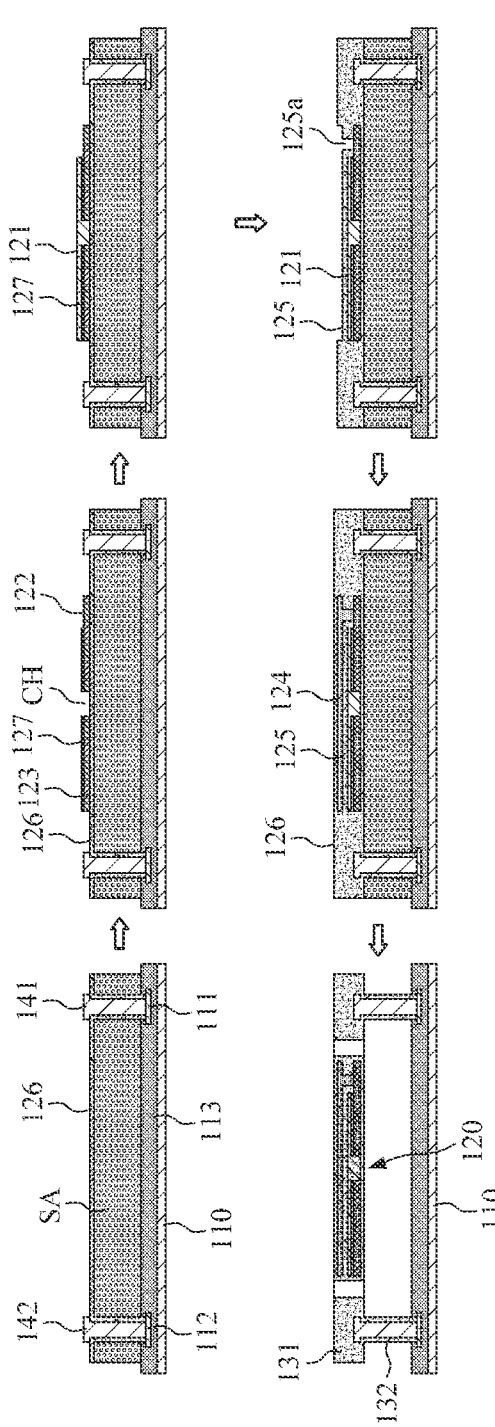
FIG. 12 is a diagram explaining a method of manufacturing the thermal image sensor according to the embodiments of the present disclosure.

FIG. 12 is a diagram explaining a method of manufacturing the thermal image sensor according to embodiments of the present disclosure.

Referring to FIG. 12, the row electrode 111 and the column electrode 112 may be first formed on the substrate 110, and then the sacrificial layer SA and the protecting layer 126 may be sequentially stacked thereon. Then, anchor holes for exposing the row electrode 111 and the column electrode 112 may be formed by passing from the protecting layer 126 to the sacrificial layer SA, and then the first intervening electrode 141 and the second intervening electrode 142 may be patterned in the anchor holes and the protecting layer 126. This process may be performed in the same manner as in the above embodiment.

Then, the first sensing electrode 122 and the second sensing electrode 123 are formed on the protecting layer 126 to be connected to the first intervening electrode 141 and the second intervening electrode 142. Subsequently, the sensing layer 121 may be formed on the first sensing electrode 122 and the second sensing electrode 123. If the resistance reducing layer 127 is further formed on the first sensing electrode 122 and the second sensing electrode 123, the sensing layer 121 may be formed on the resistance reducing layer 127. Then, the insulating layer 125 may be formed for entirely covering the first sensing electrode 122, the second sensing electrode 123, and the sensing layer 121.

Next, the via hole 125a for exposing the first sensing electrode 122 is formed on the insulating layer 125, and then the absorbing electrode 124 is formed in the via hole 125a and the insulating layer 125. Thereafter, the protecting layer 126 may be formed for entirely covering the absorbing electrode 124.

Then, the insulating layer 125 and the protecting layer 126 are partially removed by an etching process, to form the supporting arms 131 of the supports 130. Next, the sacrificial layer SA may be removed to complete the manufacturing process of the thermal image sensor 300.

Figure 13:
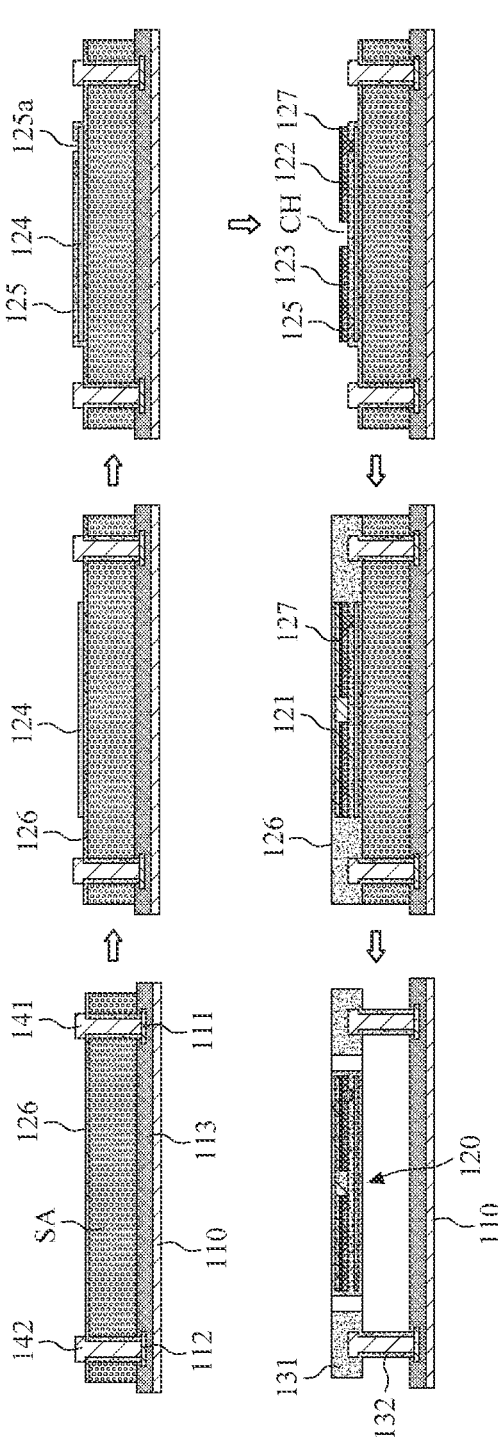
FIG. 13 is a diagram explaining a method of manufacturing the thermal image sensor according to the embodiments of the present disclosure.

FIG. 13 is a diagram explaining a method of manufacturing the thermal image sensor according to embodiments of the present disclosure.

Referring to FIG. 13, the row electrode 111 and the column electrode 112 may be first formed on the substrate 110, and then the sacrificial layer SA and the protecting layer 126 may be sequentially stacked thereon. Then, anchor holes for exposing the row electrode 111 and the column electrode 112 may be formed by passing from the protecting layer 126 to the sacrificial layer SA, and then the first intervening electrode 141 and the second intervening electrode 142 may be patterned in the anchor holes and the protecting layer 126. This process may be performed in the same manner as in the above embodiment.

Then, the absorbing electrode 124 may be formed on the protecting layer 126. Subsequently, the insulating layer 125 may be formed for entirely covering the absorbing electrode 124. Next, the via hole 125a for exposing the absorbing electrode 124 is formed on the insulating layer 125, and then the first sensing electrode 122 is formed in the via hole 125a and the insulating layer 125, to be connected to the first intervening electrode 141. Then, the second sensing electrode 123 is formed on the insulating layer 125 to be connected to the second intervening electrode 142.

Subsequently, the sensing layer 121 may be formed on the first sensing electrode 122 and the second sensing electrode 123. If the resistance reducing layer 127 is further formed on the first sensing electrode 122 and the second sensing electrode 123, the sensing layer 121 may be formed on the resistance reducing layer 127. Then, the protecting layer 126 may be formed for entirely covering the sensing layer 121.

Then, the insulating layer 125 and the protecting layer 126 are partially removed by an etching process, to form the supporting arms 131 of the supports 130. Next, the sacrificial layer SA may be removed to complete the manufacturing process of the thermal image sensor 400.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A thermal image sensor comprising:
   a substrate;
   a multi-layer stack that is suspended above the substrate and comprises:
      a sensing layer configured to convert light energy into heat energy;
      a first sensing electrode and a second sensing electrode which are in contact with the sensing layer;
      a channel formed between the first sensing electrode and the second sensing electrode,
      an absorbing electrode connected to the first sensing electrode and configured to generate polarization in the sensing layer,
      an insulating layer configured to insulate the absorbing electrode from the second sensing electrode and the sensing layer; and
   wherein the substrate is configured to detect a change in a temperature of the sensing layer.

2. The thermal image sensor of claim 1, wherein:

the substrate is positioned further away from the first sensing electrode and the second sensing electrode than from the sensing layer; and the substrate is positioned further away from the absorbing electrode than from the first sensing electrode and the second sensing electrode.

3. The thermal image sensor of claim 1, wherein:

the substrate is positioned further away from the first sensing electrode and the second sensing electrode than from the sensing layer; and the substrate is positioned closer to the absorbing electrode than to the sensing layer.

4. The thermal image sensor of claim 1, wherein:

the substrate is positioned closer to the first sensing electrode and the second sensing electrode than to the sensing layer; and the substrate is positioned further away from the absorbing electrode than from the sensing layer.

5. The thermal image sensor of claim 1, wherein:

the substrate is positioned closer to the first sensing electrode and the second sensing electrode than to the sensing layer; and the substrate is positioned closer to the absorbing electrode than to the first sensing electrode and the second sensing electrode.

6. The thermal image sensor of claim 1, wherein a center region of the absorbing electrode corresponds to a center region of the channel provided between the first sensing electrode and the second sensing electrode.

7. The thermal image sensor of claim 1, wherein the multi-layer stack further comprises a resistance reducing layer provided between the first sensing electrode and the sensing layer and between the second sensing electrode and the sensing layer.

8. The thermal image sensor of claim 7, wherein the resistance reducing layer contains a donor impurity and an acceptor impurity.

9. The thermal image sensor of claim 1, wherein the absorbing electrode comprises titanium nitride (Tin).

10. A bolometer comprising:

a substrate;

a supporting arm provided on the substrate; and a multi-layer stack that is suspended above the substrate through the supporting arm and comprises:

a sensing layer configured to convert light energy into heat energy;

a first sensing electrode and a second sensing electrode which are in contact with the sensing layer;

a channel formed between the first sensing electrode and the second sensing electrode; and an absorbing electrode connected to the first sensing electrode and configured to generate polarization in the sensing layer, wherein the substrate comprises at least one electrode connected to the first sensing electrode and the second sensing electrode to detect a change in a temperature of the sensing layer.

11. A method of manufacturing a thermal image sensor, the method comprising:

(a) forming a row electrode and a column electrode on a substrate, followed by sequentially stacking a sacrificial layer and a protecting layer;

(b) forming anchor holes to expose the row electrode and the column electrode by etching through the protecting layer to the sacrificial layer, and then patterning a first intervening electrode and a second intervening electrode in the anchor holes and the protecting layer;

(c) forming a multi-layer stack on the protecting layer, the multi-layer stack comprising a sensing layer, a first sensing electrode and a second sensing electrode which are in contact with the sensing layer with a channel formed between the first sensing electrode and the second sensing electrode, and are connected to the first intervening electrode and the second intervening electrode, an absorbing electrode connected to the first sensing electrode, and an insulating layer configured to insulate the absorbing electrode from the second sensing electrode and the sensing layer; and (d) removing the sacrificial layer.

12. The method of claim 11, wherein the step (c) comprises:

forming the sensing layer on the protecting layer;

forming the first sensing electrode and the second sensing electrode on the sensing layer to connect the first sensing electrode and the second sensing electrode to the first intervening electrode and the second intervening electrode;

forming the insulating layer to cover the first sensing electrode, the second sensing electrode, and the sensing layer; and forming a via hole to expose the first sensing electrode in the insulating layer, and then forming the absorbing electrode in the via hole and the insulating layer.

13. The method of claim 11, wherein the step (c) comprises:

forming the absorbing electrode on the protecting layer;

forming the insulating layer to cover the absorbing electrode;

forming the sensing layer on the insulating layer; and forming a via hole to expose the absorbing electrode in the insulating layer, and then forming the first sensing electrode in the via hole and the sensing layer to connect the first sensing electrode to the first intervening electrode, and forming the second sensing electrode on the sensing layer to connect the second sensing electrode to the second intervening electrode.

14. The method of claim 11, wherein the step (c) comprises:

forming the first sensing electrode and the second sensing electrode on the protecting layer to connect the first sensing electrode and the second sensing electrode to the first intervening electrode and the second intervening electrode;

forming the sensing layer on the first sensing electrode and the second sensing electrode;

forming the insulating layer to cover the first sensing electrode, the second sensing electrode, and the sensing layer; and forming a via hole to expose the first sensing electrode in the insulating layer, and then forming the absorbing electrode in the via hole and the insulating layer.

15. The method of claim 11, wherein the step (c) comprises:

forming the absorbing electrode on the protecting layer;

forming the insulating layer to cover the absorbing electrode;

forming a via hole to expose the absorbing electrode in the insulating layer, and then forming the first sensing electrode in the via hole and the insulating layer to connect the first sensing electrode to the first intervening electrode, and forming the second sensing electrode on the insulating layer to connect the second sensing electrode to the second intervening electrode; and forming the sensing layer on the first sensing electrode and the second sensing electrode.

16. The method of claim 11, wherein the step (c) comprises forming a resistance reducing layer between the first sensing electrode and the sensing layer and between the second sensing electrode and the sensing layer.

17. The method of claim 16, wherein the resistance reducing layer contains a donor impurity and an acceptor impurity.

18. The method of claim 11, wherein the absorbing electrode comprises titanium nitride (Tin).

19. The method of claim 11, wherein the first sensing electrode and the second sensing electrode comprise titanium nitride (Tin).

20. The method of claim 11, wherein the sensing layer comprises Amorphous Silicon.

* * * * *